United States Patent
Wang

(10) Patent No.: US 7,545,145 B2
(45) Date of Patent: Jun. 9, 2009

(54) METHOD AND APPARATUS FOR TENSORIAL MICRO-RESISTIVITY IMAGING IN OIL-BASED MUDS

(75) Inventor: Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 68 days.

(21) Appl. No.: 11/416,590

(22) Filed: May 3, 2006

(65) Prior Publication Data

US 2007/0257678 A1 Nov. 8, 2007

(51) Int. Cl.
*G01V 3/20* (2006.01)
*G01V 3/26* (2006.01)

(52) U.S. Cl. .................. 324/366; 324/355; 324/367; 324/369

(58) Field of Classification Search ............... 324/355, 324/366, 367, 368, 369, 370, 371, 372, 373, 324/374, 375, 356
See application file for complete search history.

(56) References Cited

U.S. PATENT DOCUMENTS

| | | | |
|---|---|---|---|
| 2,930,969 A | 3/1960 | Baker ........................ 324/10 |
| 4,468,623 A | 8/1984 | Gianzero et al. ............ 324/367 |
| 5,502,686 A | 3/1996 | Dory et al. .................... 367/34 |
| 5,850,624 A | 12/1998 | Gard et al. |
| 6,191,588 B1 | 2/2001 | Chen .......................... 324/367 |
| 6,342,784 B1 | 1/2002 | Wollin |
| 6,348,796 B2 | 2/2002 | Evans et al. ................. 324/374 |
| 6,600,321 B2 * | 7/2003 | Evans ........................ 324/369 |
| 6,919,724 B2 | 7/2005 | Cheung et al. |
| 7,027,923 B2 * | 4/2006 | Barber et al. .................. 702/7 |
| 2003/0197510 A1 * | 10/2003 | Gianzero et al. ............ 324/367 |
| 2003/0222651 A1 | 12/2003 | Tabanou .................... 324/367 |
| 2004/0100263 A1 * | 5/2004 | Fanini et al. ................ 324/339 |
| 2005/0088181 A1 * | 4/2005 | Barber et al. ............... 324/346 |
| 2005/0242819 A1 | 11/2005 | Gold et al. .................. 324/367 |

FOREIGN PATENT DOCUMENTS

| | | |
|---|---|---|
| CA | 685727 | 5/1964 |
| WO | WO2005/006023 | 1/2005 |

* cited by examiner

*Primary Examiner*—Reena Aurora
*Assistant Examiner*—David M. Schindler
(74) *Attorney, Agent, or Firm*—Madan & Sriram, P.C.

(57) ABSTRACT

An unfocused resistivity imaging device horizontal and vertical currents conveyed into the borehole. Pad mounted electrodes are used to make voltage measurements in orthogonal directions. The voltage measurements are then rotated to give principal resistivity measurements in an anisotropic formation with dipping beds.

23 Claims, 8 Drawing Sheets

METHOD AND APPARATUS FOR TENSORIAL MICRO-RESISTIVITY IMAGING IN OIL-BASED MUDS

BACKGROUND OF THE INVENTION

1. Field of the Invention

This invention generally relates to explorations for hydrocarbons involving electrical investigations of a borehole penetrating an earth formation. More specifically, this invention relates to highly localized borehole investigations employing the introduction and measuring of individual survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present invention belongs to the first category.

Techniques for investigating the earth formation with arrays of measuring electrodes exist. See, for example, the U.S. Pat. No. 2,930,969 to Baker, Canadian Pat. No. 685727 to Mann et al. U.S. Pat. No. 4,468,623 to Gianzero, and U.S. Pat. No. 5,502,686 to Dory et al. U.S. Pat. No. 6,348,796 to Evans et al., having the same assignee as the present invention and the contents of which are incorporated herein by reference, discloses an apparatus for obtaining resistivity images of a borehole includes an array of measure electrodes separated from a pad or the body of the instrument by a focusing electrode. The focusing electrode is maintained at a slightly higher potential than the measure electrodes. A modulated electrical current with a carrier frequency of 1 MHz is injected into the formation. When used with a non-conducting fluid, capacitive coupling between the electrode and the conductive formation is provided by the dielectric of fluid. When used with a conducting borehole fluid, an additional capacitor may be incorporated into the circuit. The current in the measure electrode is indicative of the conductivity of the formation.

In oil-based muds, unfocused methods provides an alternative to the focused methods such as the device of Evans. In such devices, the electrodes are voltage measuring electrodes on a non-conducting pad. A current source and a current return provide a current flow in the formation parallel to the pad and voltage differences between electrodes are indicative of the formation resistivity. See, for example, U.S. Pat. No. 6,191,588 to Chen and WO2005/006023 of Cheung et al. With such a device, the problems caused by variations in standoff of the individual electrodes from the borehole wall are substantially eliminated. We refer to such devices as "four-terminal" devices and the corresponding methods as "four-terminal" methods.

However, because the four-terminal methods measures the formation resistivity with electrodes arranged in a direction parallel to the borehole wall, the image will depend on the direction of measurement for a layered or other inhomogeneous formation. The conventional resistivity imaging tools like that of Evans which measures the radial formation resistivity does not have this limitation. Specifically, if the bedding plane is inclined to the plane defined by a row of electrodes in an unfocused device, the measured resistivity will be a combination of the horizontal and vertical resistivity (defined here as parallel to and perpendicular to the bedding plane).

FIG. 2 (prior art, from Evans) illustrates an exemplary array of measure electrodes 115a, 115b, 115c . . . set within a substantially rectangular guard electrode 103 with gaps 107a (that contain insulating material therein). The guard electrode 103 is separated from the pad or body 101 by a substantially rectangular insulating gap 107b. In one embodiment of the invention, the spacing between the measure electrodes is selected as to provide overlap in azimuth and depth, i.e., the diameter D of the measure electrode is greater than the horizontal spacing $d_1$ of the electrodes 115b, 115c in adjacent rows and the vertical spacing $d_2$ between the rows of electrodes. In another embodiment of the invention, the electrodes do not have this azimuthal and vertical overlap, but due to a broadening of the measure beam used in Evans, overlap in azimuth and borehole depth of the region of investigation is obtained.

FIG. 3 depicts a borehole 121 penetrating a dipping-bed formation. The dipping beds are denoted by 123. When a focused imaging tool such as that of Evans is conveyed in the borehole, the tool should read the horizontal resistivity of the formation (the resistivity parallel to the bedding plane) when the pad surface is normal to the y-axis. This is because the focused currents travel radially into the formation, i.e., along the y-axis and parallel to the bedding. If, on the other hand, the pad surface is normal to the x-axis, the radial currents from the borehole will cut across the bedding plane and will be effected by both horizontal and vertical formation resistivities. However, since the current flowing into the formation is governed mainly by the conductive beds, the resistivity parallel to bedding again controls the measurement made by the focused imaging tool except at very steep dips. At intermediate pad face angles (between the x- and y-axes, both horizontal and vertical resistivities will affect the measure current of the tool.

The present invention is directed towards a method and apparatus that are relatively insensitive to the formation dip and may be used with an unfocused tool within a borehole, and may also be used with oil-based mud.

SUMMARY OF THE INVENTION

One embodiment of the invention is an apparatus for evaluating an earth formation. The apparatus includes a logging tool conveyed into a borehole in the earth formation. A first pair of current electrodes conveys a first current into the earth formation. A first pair of voltage electrodes on the tool provides a first voltage measurement in a first direction. A second pair of voltage electrodes provides a second voltage measurement in a second direction substantially orthogonal to the first direction. A processor uses the first and second voltage measurements to estimate a horizontal resistivity and a vertical resistivity of the earth formation, the estimation using a coordinate rotation.

Another embodiment of the invention is a method of evaluating an earth formation. A current is conveyed into the earth formation. A voltage difference is measured in first and second directions substantially orthogonal to each other. Using the two voltage differences and a coordinate rotation, a horizontal resistivity and a vertical resistivity of the earth are estimated.

Another embodiment of the invention is a computer readable medium for use with an apparatus for evaluating an earth formation. The apparatus includes a logging tool conveyed into a borehole in the earth formation. A first pair of current electrodes conveys a first current into the formation. Two pairs of voltage electrodes measure a voltage difference in two substantially orthogonal directions. The medium includes instructions which enable a processor to use the voltage measurements to estimate a horizontal resistivity and a vertical resistivity of the earth formation using a coordinate transformation.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
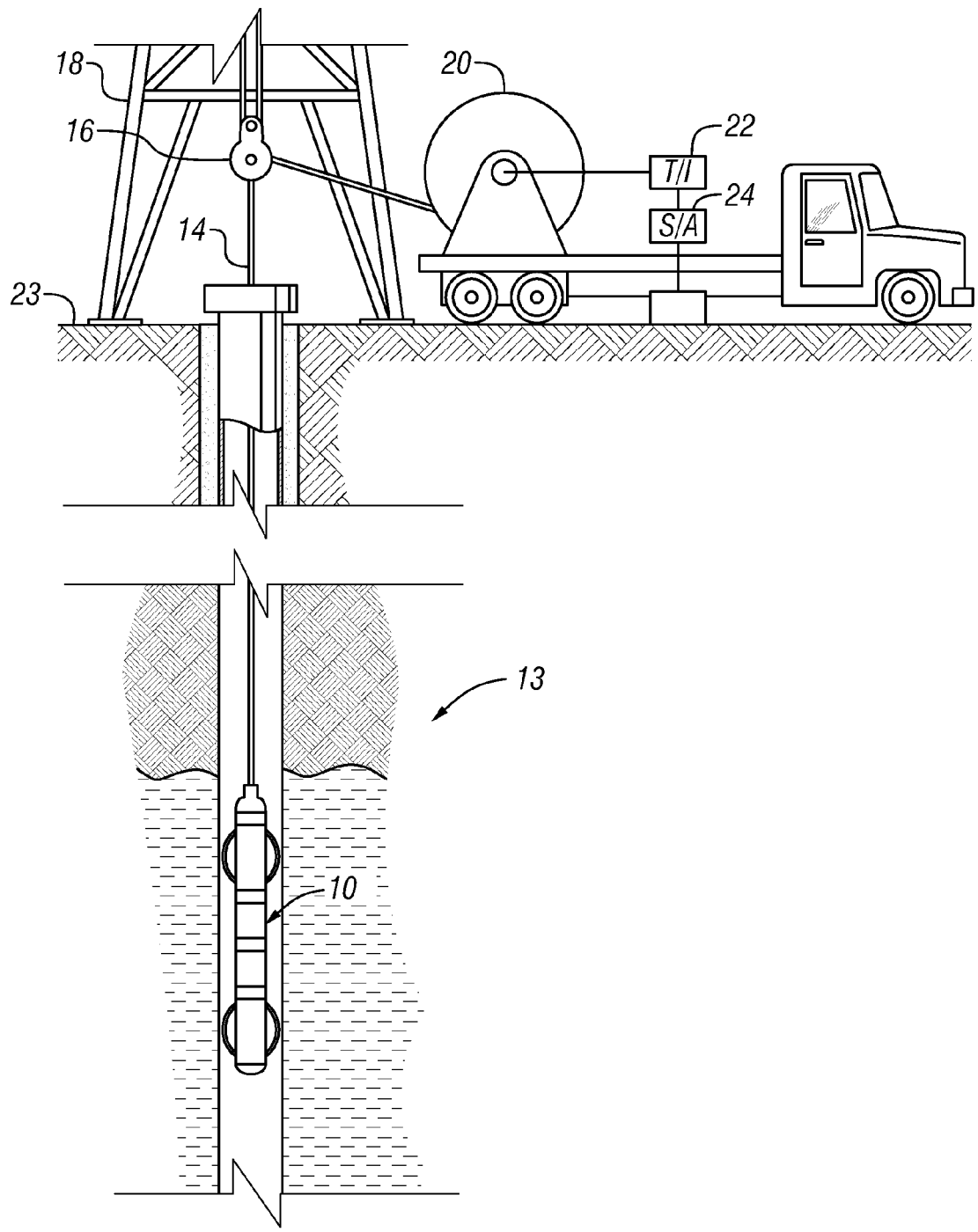
FIG. 1 shows the logging tool of this invention suspended in a borehole.

In order to gain a proper understanding of the present invention, reference is made to FIGS. 1-5. FIG. 1 shows an imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

Figure 2:
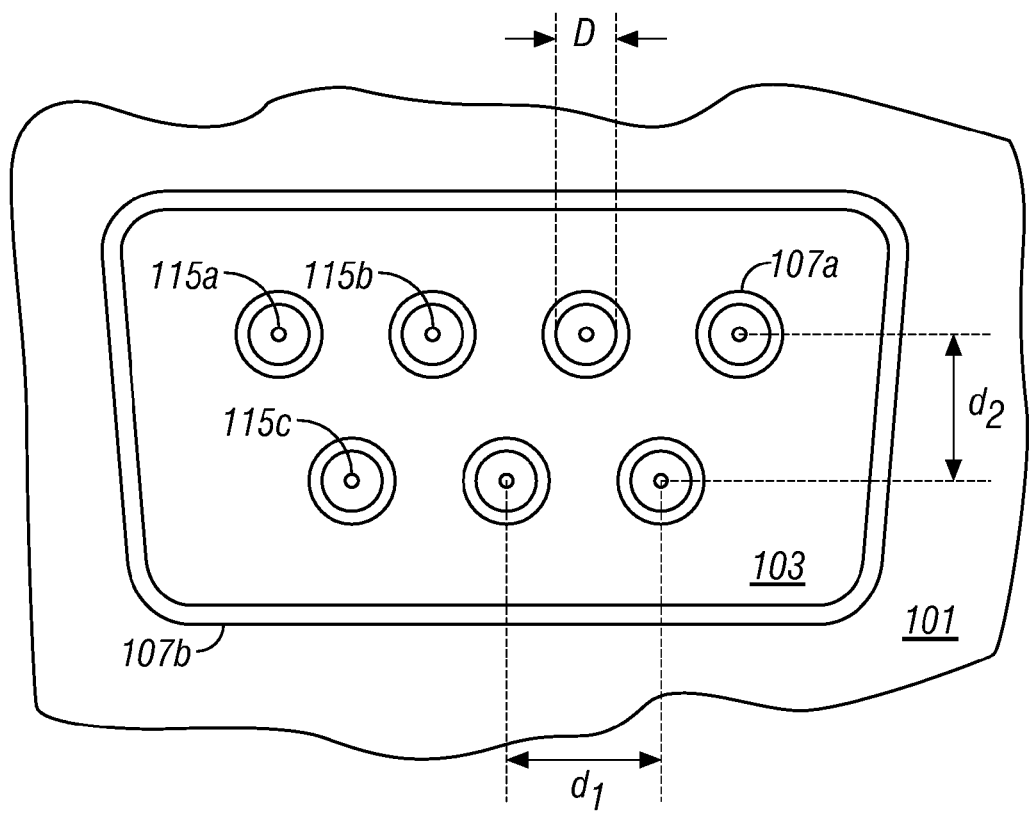
FIG. 2 (prior art) is a mechanical schematic view of a prior art focused imaging tool.
Figure 3:
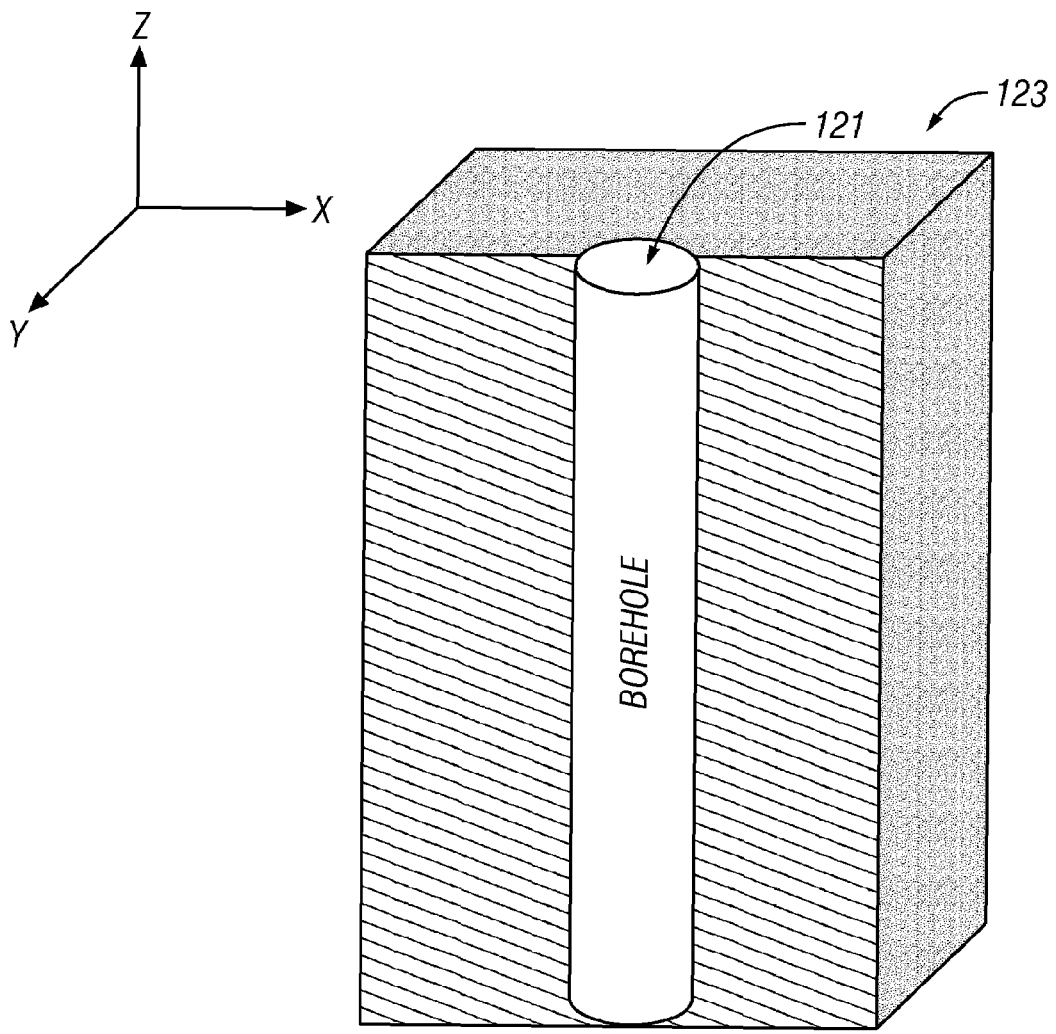
FIG. 3 illustrates a borehole in a dipping formation.

FIG. 2 (prior art) illustrates an array of measure electrodes 315a, 315b, 315c . . . set within a substantially rectangular guard electrode 303 with gaps 307a (that contain insulating material therein). The guard electrode 303 is separated from the pad or body 301 by a substantially rectangular insulating gap 307b. In one embodiment of the invention, the spacing between the measure electrodes is selected to provide overlap in azimuth and depth, i.e., the diameter D of the measure electrode is greater than the horizontal spacing $d_1$ of the electrodes 315b, 315c in adjacent rows and the vertical spacing $d_2$ between the rows of electrodes. The pad may be extended from the body of the logging tool by a suitable extension device.

Figure 4:
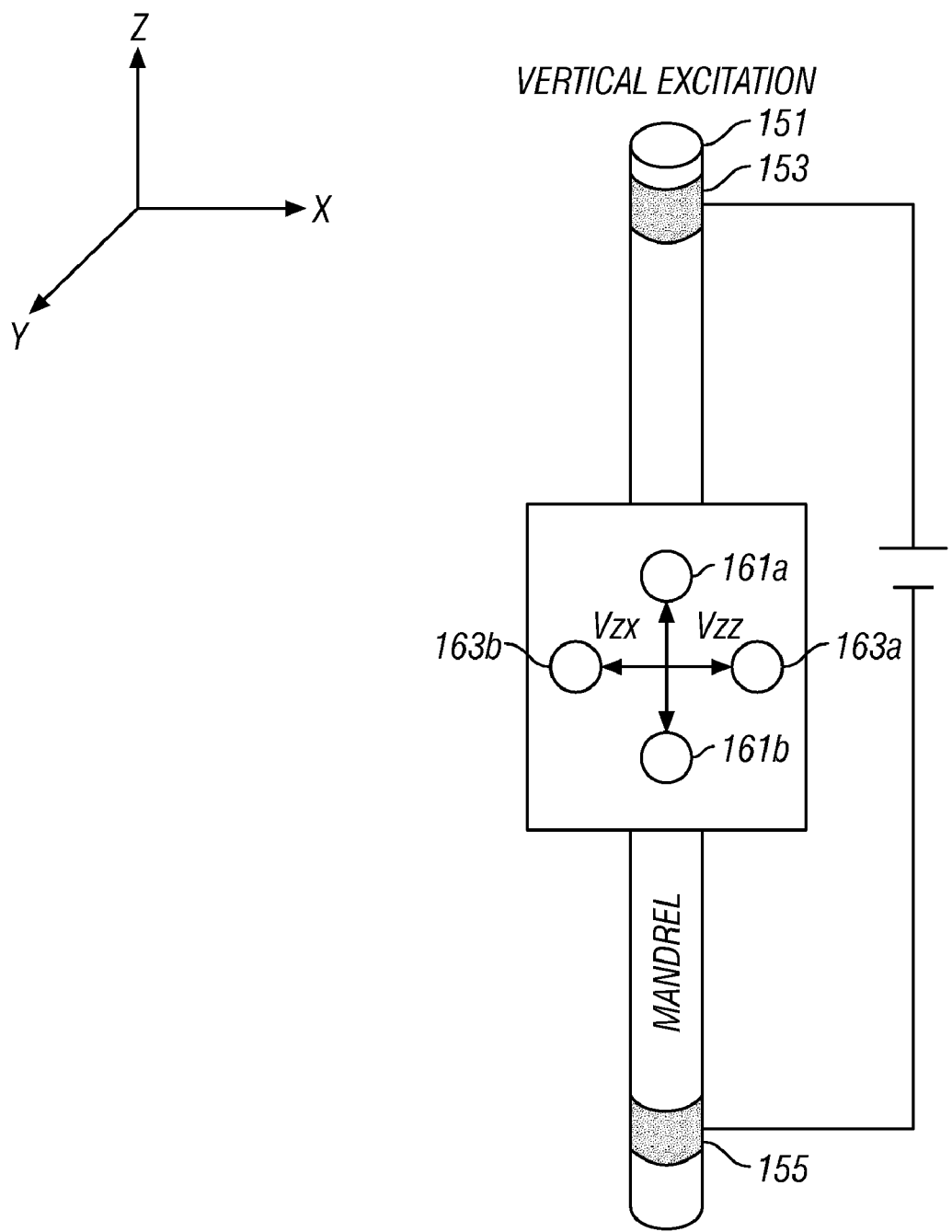
FIG. 4 shows an electrode arrangement for measuring both vertical and horizontal potential differences with current excitation in the vertical direction.
Figure 5:
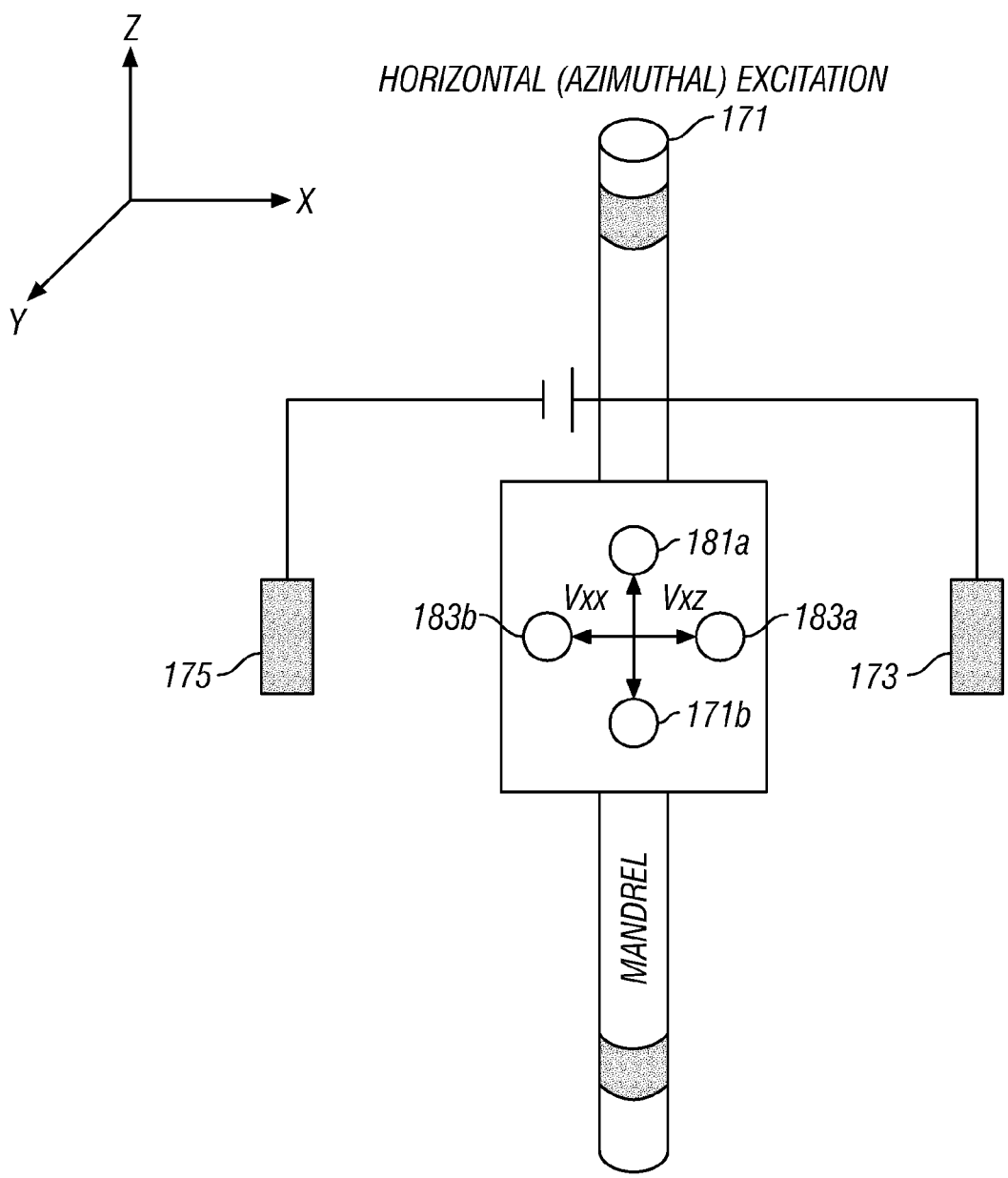
FIG. 5 shows an electrode arrangement for measuring both vertical and horizontal potential differences with current excitation in the horizontal or azimuthal direction.

Turning now to FIG. 4, a tool mandrel 151 that is part of the logging tool is shown. To simplify the illustration, the borehole is not shown. Current is passed vertically through the formation (parallel to the wellbore) using a first pair of current electrodes 153, 155. The electrode pair 161a, 161b measures a voltage $V_{zz}$ in the vertical direction and may be referred to as a first pair of voltage electrodes. If the pad surface is normal to the y-axis, the second voltage electrode pair 163a, 163b measures a voltage $V_{xx}$ in the horizontal (circumferential to the wellbore) direction. Here, the first subscript stands for the current injection direction and the second for the potential drop measurement direction. Similarly, for the configuration of FIG. 5, current is injected in a horizontal (circumferential to the wellbore) using a pair of horizontally separated current electrodes 173, 175. Electrodes 181a, 181b measured $V_{xz}$ while azimuthally-separated electrodes 183a, 183b measured $V_{xx}$. The same voltage electrodes may be used for measuring the voltage resulting from the vertical current flow and the horizontal current flow. The measurements made by the electrodes in FIGS. 4 and 5 can be assembled into a tensor $$V = \begin{bmatrix} V_{xx} & V_{zx} \\ V_{xz} & V_{zz} \end{bmatrix}, \tag{1}$$

which can be written in terms of an apparent resistivity tensor R as $$R = \begin{bmatrix} V_{xx} & V_{zx} \\ V_{xz} & V_{zz} \end{bmatrix} \begin{bmatrix} K_x & \\ & K_z \end{bmatrix} = \begin{bmatrix} R_{xx} & R_{zx} \\ R_{xz} & R_{zz} \end{bmatrix}, \tag{2}$$

where $K_x$ and $K_z$ are geometrical factors for horizontal (azimuthal) and vertical excitations respectively. These are obtained by modeling results or by making suitable calibration measurements in a test tank.

The resistivity tensor R of eqn. (2) in the tool coordinate system can be obtained by successive rotations of the resistivity tensor in the earth coordinate system $\hat{R}$ $$\Theta^T R \Theta = \begin{bmatrix} R_h & 0 \\ 0 & R_v \end{bmatrix} = \hat{R}, \tag{3}$$

$$\Theta = \begin{bmatrix} \cos\theta & \sin\theta \\ -\sin\theta & \cos\theta \end{bmatrix},$$

where $R_h$ and $R_v$ are the formation resistivities parallel to and perpendicular to the bedding planes respsectively, and θ is the angle between the bedding plane and the longitudinal axis of the tool. It is to be reiterated that the analysis above is for the situation illustrated in FIG. 3 where the bedding plane is orthogonal to the y-axis. Those versed in the art would also recognize that what has been done by eqn. (3) is an diagonalization of the measured resistivity tensor R. Thus, if the measurements are made with the pad along the y-axis, it is possible to recover the horizontal and vertical resistivities as well as the dip angle θ. Usually, the larger eigenvalue corresponds to the vertical resistivity and the smaller eigenvalue corresponds to the horizontal resistivity.

Figure 6B:
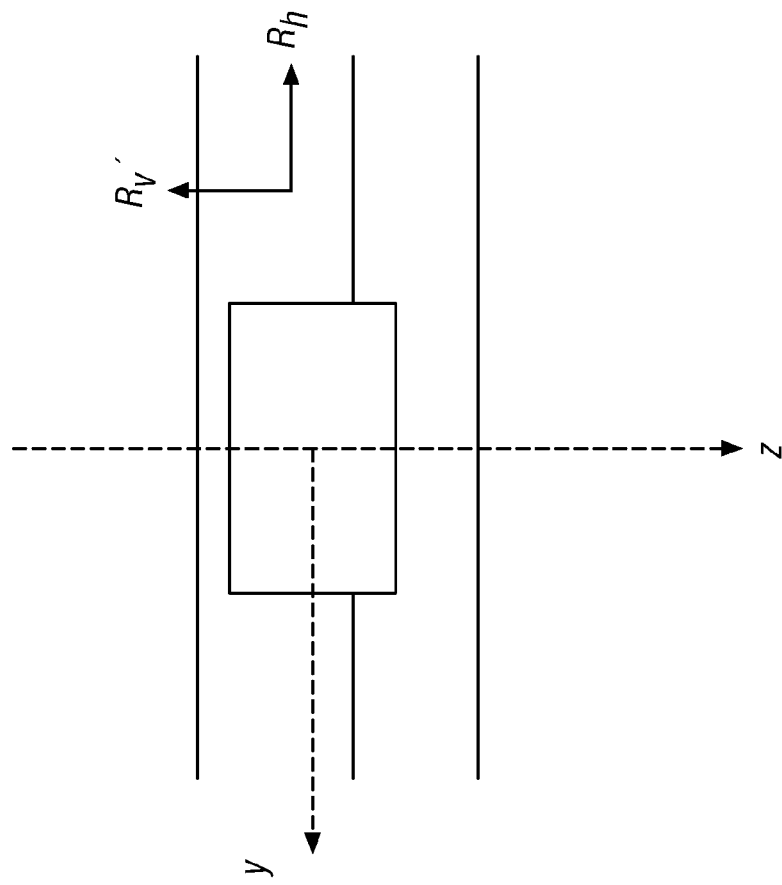
FIG. 6b shows front view of the pad facing the x-axis along with bedding planes.
Figure 6A:
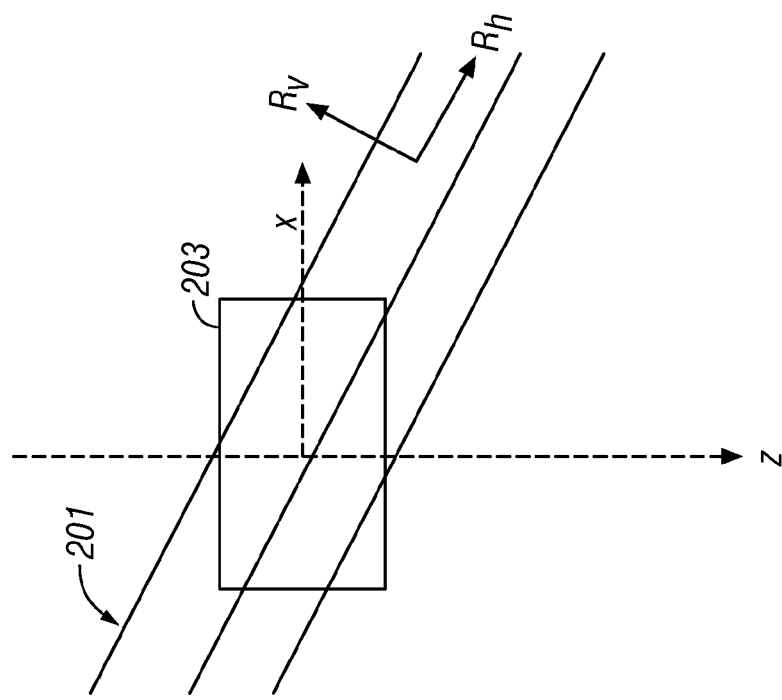
FIG. 6a shows front view of the pad facing the y-axis along with bedding planes.

Referring to FIG. 6a, the pad 203 is shown along with bedding plane 201 when the pad is oriented along the y-axis. $R_{xx}$ and $R_{zz}$ in this orientation will satisfy the relation:

$$R_v > R_{xx} > R_h;$$

$$R_v > R_{zz} > R_h \qquad (4).$$

When the pad is not orthogonal to the y-axis, it is still possible to do the eigenvalue decomposition of the measured resistivity tensor R, but the recovered eigenvalues will no longer be the horizontal and vertical resistivities of the formation. Referring to FIG. 6b, $R_{yy}$ and $R_{zz}$ in this orientation will satisfy the relation:

$$R_v > R_{zz};$$

$$R_{yy} = R_h \qquad (5).$$

It can be shown that the ratio of the larger eigenvalue to the smaller eigenvalue is the greatest when the pad face is orthogonal to the y-axis. Based on a recognition of this fact, it is thus possible to use the measurements from a plurality of pads on the logging tool, each of the pads facing a different direction, to determine the horizontal and vertical resistivity of the formation. One simply goes through the eigenvalue decomposition of eqn. (3) for each of the pads, and identifies the particular set of electrodes on a particular pad for which the ratio of the eignevalues is a maximum. This pad is then identified as being perpendicular to the bedding plane, and the corresponding eigenvalues give the horizontal and vertical resistivities. Alternatively, for a Measurement-while-drilling (MWD) implementation, measurements made with a single pad as the tool rotates can be used to get the formation dip and the horizontal and vertical resistivities.

When the pad surface is normal to the x-axis, the focused resistivity tool of Evans will measure a mixture of the resistivities parallel and normal to the bedding planes. The amount of current flowing into the formation will be dictated by the conductive beds. Hence, except for steeply dipping beds, it is the resistivity parallel to the bedding plane that controls the current measurement. Consequently, a measurement of the resistivity parallel to the bedding plane is again desirable to mimic the focused resistivity image. For other pad positions the measurement will be somewhere between the above two cases.

Figure 7B:
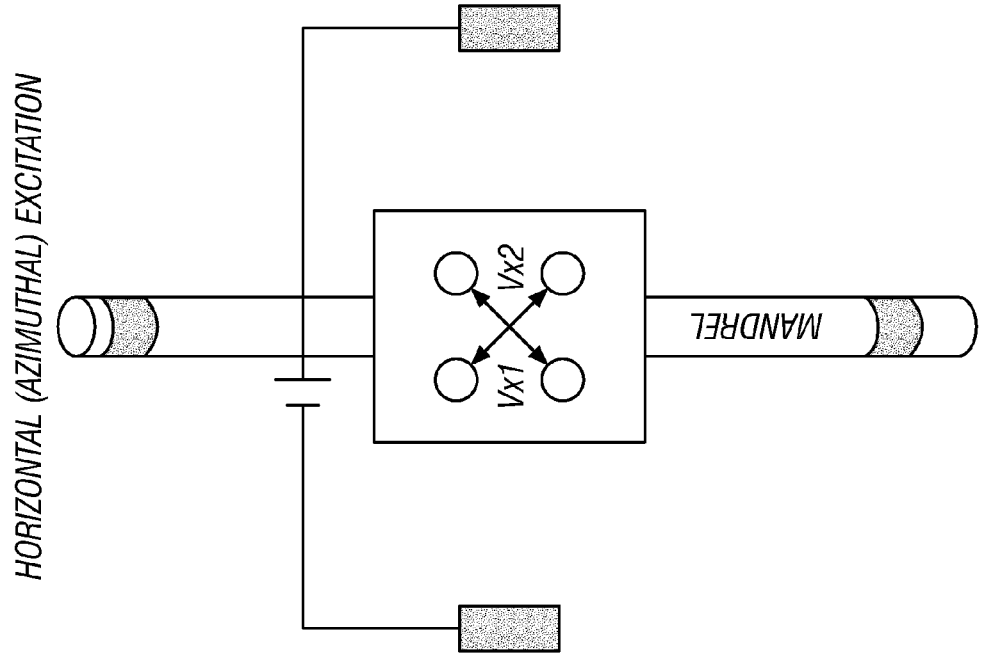
FIGS. 7a and 7b shows variations of FIGS. 4 and 5 in which the electrodes are rotated.
Figure 7A:
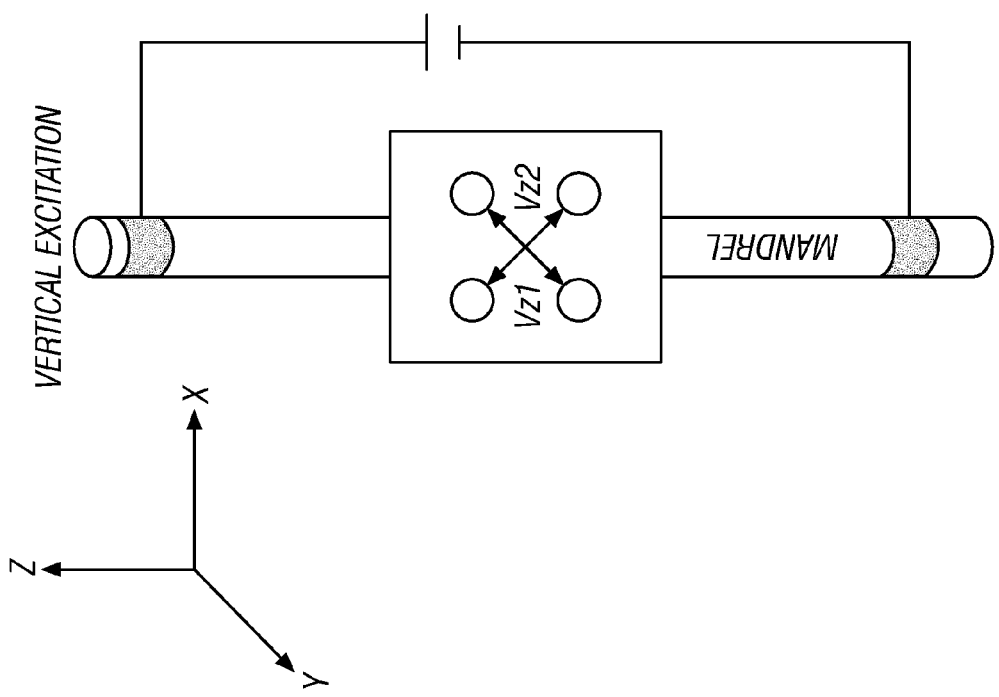

Other electrode orientations may be used as long as the two measured components are orthogonal to each other. For example, FIG. 7a shows an arrangement in which the current path is vertical and the voltage is measured at two paris of electrodes to give measurements $V_{z1}$ and $V_{z2}$, while FIG. 7b shows an arrangement in which the current is horizontal (orthogonal to the current in FIG. 7a) and the same electrodes are used to give voltages $V_{x1}$ and $V_{x2}$.

Figure 8:
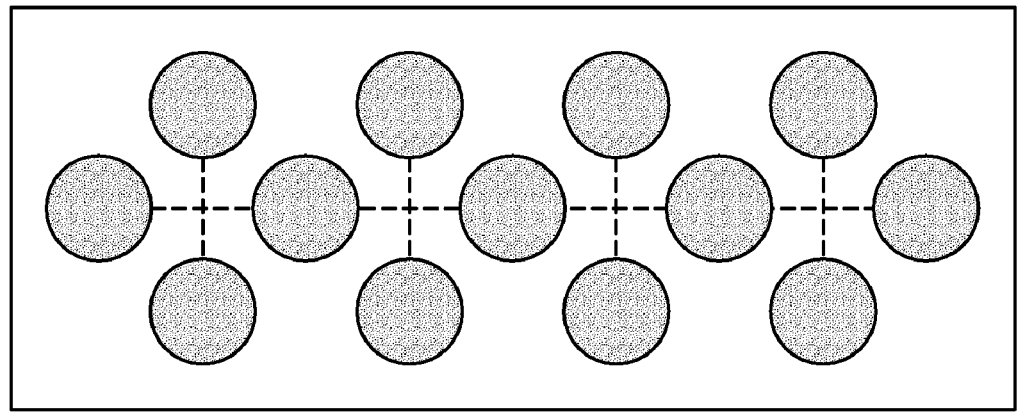
FIG. 8 shows an electrode arrangement in which tensor potential differences are measured at multiple azimuthal positions using three rows of electrodes.

FIG. 8 shows an arrangement in which multiple pairs of voltage measurement electrodes can be used to measure voltage differences at multiple horizontal and vertical positions.

Figure 9:
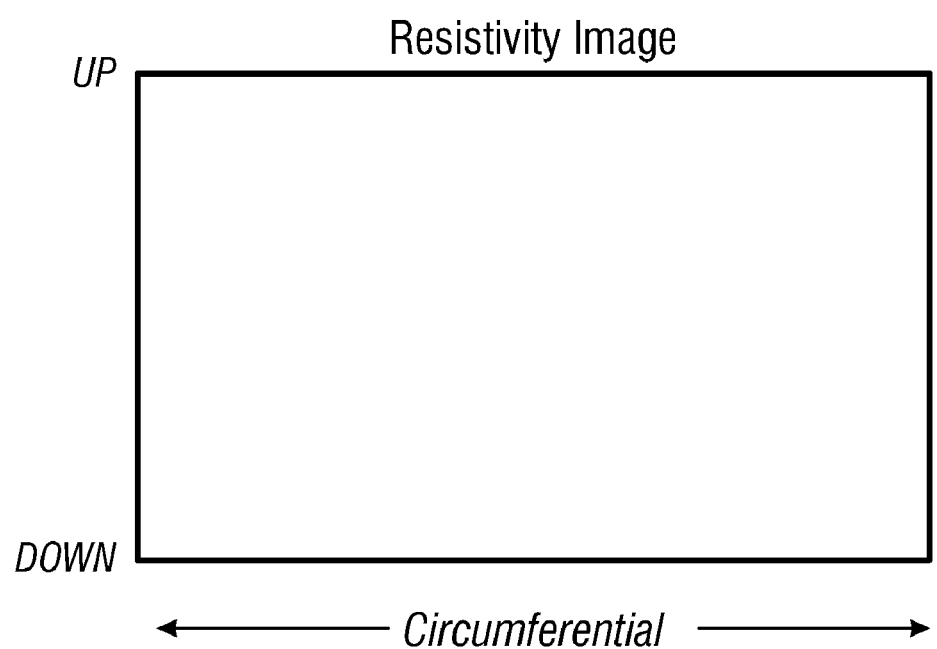
FIG. 9 shows a resistivity image of the borehole.

It should be noted that the invention has been described generally in terms of determination of horizontal and vertical resistivity of the earth formation. Those versed in the art would recognize that the method is also applicable to determination of horizontal conductivity and vertical conductivity; accordingly, determination of horizontal resistivity and vertical resistivity is to be construed as including a determination of horizontal conductivity and vertical conductivity. It should further be noted that the apparatus can also provide a resistivity image of the borehole using measurements from neighboring sets of electrodes. An exemplary resistivity image of the borehole is shown in FIG. 9.

For all of the electrode configurations described above, the vertical current flow may be obtained by using current electrodes that are on the pad or off the pad. In the latter case, they may be on the mandrel or at a remote location on the logging string (or BHA). The horizontal current flow may be obtained using current electrodes on the pad.

The processing of the data may be done with the use of a computer program implemented on a suitable machine readable medium that enables the processor to perform the control and processing. The term processor as used in this application is used in its traditionally-broad sense and is intended to include such devices as single-core computers, multiple-core computers, distributed computing systems, field programmable gate arrays (FPGAs) and the like. The machine readable medium referenced in this disclosure is any medium that may be read by a machine and may include magnetic media, RAM, ROM, EPROM, EAROM, flash memory and optical disks. The processing may be done downhole or at the surface. In an alternative embodiment, part of the processing may be done downhole with the remainder conducted at the surface.

The invention has further been described by reference to logging tools that are intended to be conveyed on a wireline. However, the method of the present invention may also be used with measurement-while-drilling (MWD) tools, or logging while drilling (LWD) tools, either of which may be conveyed on a drillstring or on coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for evaluating an earth formation, the apparatus comprising:
   (a) a logging tool configured to be conveyed into a borehole in the earth formation;
   (b) a first pair of current electrodes configured to convey a first current into the earth formation;
   (c) a first pair of voltage electrodes on the logging tool configured to provide first voltage measurement in a first direction resulting from the first current;
   (d) a second pair of voltage electrodes on the logging tool configured to provide a second voltage measurement in a second direction substantially orthogonal to the first direction responsive to the first current; and
   (e) a processor configured to use the first and second voltage measurements to estimate a horizontal resistivity and a vertical resistivity of the earth formation, the estimation being based in part on a coordinate rotation.

2. The apparatus of claim 1 further comprising a second pair of current electrodes configured to convey a second current into the earth formation in a direction substantially orthogonal to a direction of the first current and wherein the first and second pairs of voltage electrodes are further configured to provide third and fourth voltage measurements resulting from the second current.

3. The apparatus of claim 2 wherein the processor is further configured to use the third and fourth voltage measurements in estimating the horizontal resistivity and the vertical resistivity.

4. The apparatus of claim 1 wherein the first and second pairs of voltage electrodes are disposed on a pad configured to extend from a body of the logging tool.

5. The apparatus of claim 4 wherein at least one of the first pair of current electrodes is positioned at a location selected from (i) on the pad, and (ii) away from the pad.

6. The apparatus of claim 2 wherein a direction of the first current is substantially parallel to a longitudinal axis of the logging tool.

7. The apparatus of claim 2 wherein a direction of the second current is substantially orthogonal to a longitudinal axis of the logging tool.

8. The apparatus of claim 3 wherein the processor is configured to perform a diagonalization of a resistivity matrix in estimating the horizontal resistivity and the vertical resistivity, the resistivity matrix being determined from the first, second, third and fourth voltage measurements.

9. The apparatus of claim 3 wherein the processor is further configured to estimate an angle between a bedding plane and a longitudinal axis of the logging tool.

10. The apparatus of claim 1 further comprising a conveyance device which is configured to convey the logging tool into the borehole, the conveyance device selected from (i) a wireline, and (ii) a drilling tubular.

11. The apparatus of claim 1 wherein the processor is further configured to provide a resistivity image of the borehole.

12. The apparatus of claim 1 wherein the logging tool is configured to make measurements in a plurality of azimuthal orientations of the logging tool and wherein the processor is further configured to use the first and second measurements at the plurality of azimuthal orientations to estimate a horizontal resistivity and a vertical resistivity of the earth formation.

13. The apparatus of claim 12 wherein the logging tool further comprising a plurality of pads.

14. A method of evaluating an earth formation, the method comprising:
(a) using a logging tool in a borehole for conveying a first current into the earth formation;
(b) measuring a first voltage difference resulting from the first current in a first direction resulting from the first current;
(c) measuring a second voltage difference resulting from the first current in a second direction substantially orthogonal to the first direction;
(d) using the first and second voltage measurements and a coordinate rotation for estimating a horizontal resistivity and a vertical resistivity of the earth formation.

15. The method of claim 14 further comprising:
(i) conveying a second current into the earth formation in a direction substantially orthogonal to a direction of the first current;
(ii) measuring a third voltage difference and a fourth voltage difference in the first direction and the second direction resulting from the second current; and
(iii) using the third and fourth voltage measurements in the estimation of the horizontal resistivity and the vertical resistivity.

16. The method of claim 14 wherein measuring the first voltage difference and the second voltage difference further comprises using first and second pairs of voltage electrodes disposed on a pad extending from a body of a logging tool.

17. The method of claim 14 wherein conveying the first current further comprises using a pair of current electrodes positioned at a location selected from (i) on a pad, and (ii) away from a pad.

18. The method of claim 15 wherein a direction of the first current is substantially parallel to a longitudinal axis of the borehole.

19. The method of claim 15 further comprising estimating an angle between a bedding plane of the formation and a longitudinal axis of the borehole.

20. The method of claim 14 further comprising using the logging tool to make measurements in an additional azimuthal orientation of the logging tool, thereby defining a plurality of azimuthal orientation, the method further comprising using the first and second measurements at the plurality of azimuthal orientations to estimate a horizontal resistivity and a vertical resistivity of the earth formation.

21. The method of claim 20 further comprising using a plurality of pads on the logging tool to define the plurality of azimuthal orientations.

22. A computer-readable medium used with an apparatus for evaluating an earth formation, the apparatus comprising:
(a) a logging tool configured to be conveyed into a borehole in the earth formation;
(b) a first pair of current electrodes configured to convey a first current in a first direction into the earth formation;
(c) a first pair of voltage electrodes on the logging tool configured to provide a first voltage measurement in a first direction responsive to the first current;
(d) a second pair of voltage electrodes on the logging tool configured to provide a second voltage measurement in a second direction substantially orthogonal to the first direction responsive to the first current;
the medium comprising instructions which are executable to enable a processor to:
(e) use the first and second voltage measurements to estimate a horizontal resistivity and a vertical resistivity of the earth formation, the estimation being based in part on a coordinate rotation.

23. The medium of claim 22 further comprising at least one of (i) a magnetic medium, (ii) a RAM, (iii) a ROM, (iv) an EPROM, (v) an EAROM, (vi) a flash memory, and (vii) an optical disk.

* * * * *